Jan. 12, 1954        F. J. KIRBY ET AL        2,665,896
VARIABLE RESISTANCE ACCELERATION SENSITIVE DEVICE
Filed May 6, 1952
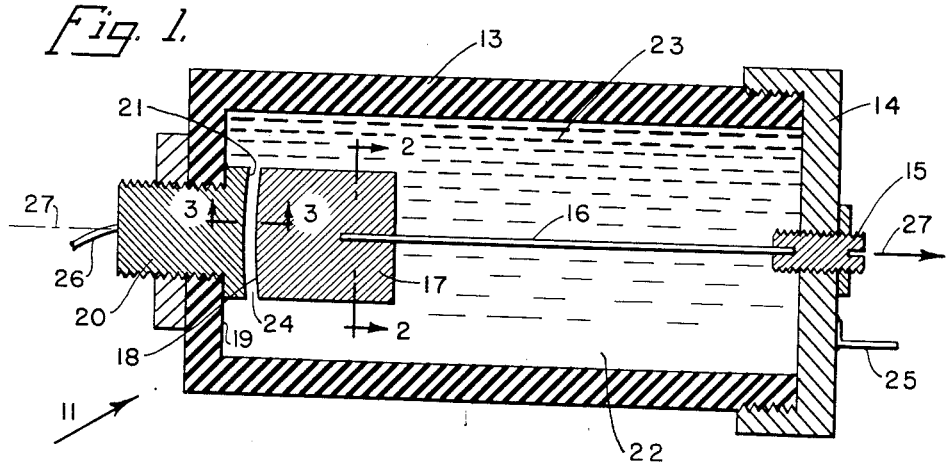
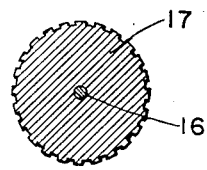
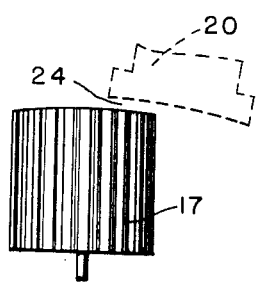
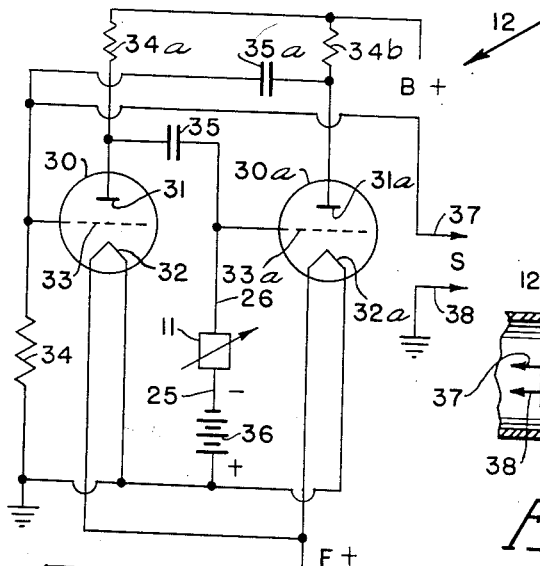
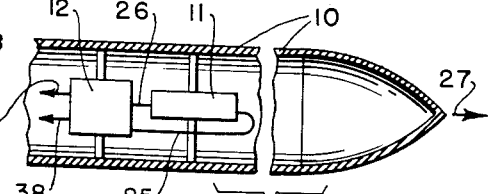
INVENTORS
FRANK J. KIRBY
WILLIS E. VORE
BY
Edward C. Walsh
J. D. O'Brien
ATTORNEYS Patented Jan. 12, 1954

2,665,896

UNITED STATES PATENT OFFICE 2,665,896

VARIABLE RESISTANCE ACCELERATION SENSITIVE DEVICE

Frank J. Kirby and Willis E. Vore, Inyokern, China Lake, Calif.

Application May 6, 1952, Serial No. 286,412

8 Claims. (Cl. 264—1)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in devices for measuring acceleration of a moving body in directions transverse to its longitudinal direction of movement.

In the prior art it has been the practice to measure acceleration by various devices employing principles including varying inductance, capacitance or resistance. For certain installations these devices have not produced optimum results due to their size, circuit complexity or lack of sensitivity of response. The resistance type, to which this invention more particularly relates, has employed variable potentiometers or strain gauges and has been objectionable for similar reasons.

One of the objects of the invention is to provide an improved resistance type acceleration responsive system.

Another object is to provide a system employing an acceleration responsive mass disposed within electrolyte, the movement of which varies the electrical resistance through a path within the electrolyte.

Another object is to provide an improved electrical circuit employing the foregoing resistance.

Other objects are to provide a more compact device of the class described, decrease circuit complexity and improve sensitivity of response.

Further objects and many of the attendant advantages of this invention will be readily appreciated as the same becomes better understood by reference to the following detailed description when considered in connection with the accompanying drawings wherein:

Fig. 1 is a longitudinal central section through an acceleration responsive device forming a portion of the subject of the invention;

Fig. 2 is a cross-section taken on line 2—2, Fig. 1;

Fig. 3 is a section taken on line 3—3, Fig. 1;

Fig. 4 is a section, similar to Fig. 1, illustrating the acceleration responsive device in operation under lateral acceleration;

Fig. 5 is a transverse cross-section of an alternative form of support rod for the acceleration responsive element illustrated in the preceding figures;

Fig. 6 is a circuit which may be employed with the apparatus of any of the preceding figures; and Fig. 7 is a fragmentary cross-section of a missile employing the apparatus of any of the preceding figures.

Referring in detail to the drawing, and particularly Figs. 1, 6 and 7, a missile 10, the lateral acceleration of which is desired, is provided with an acceleration responsive device 11, and an electronic circuit 12, these being fixed within the missile in any suitable manner.

The acceleration responsive device, as best shown in Figs. 1 to 4, comprises a cylindrical tube 13 of electrical insulating material having one end closed by a metal cap 14 to which is secured an adjustable screw 15 carrying one end of a circular metallic spring rod 16. A stainless steel weight 17 is carried by the other end of rod 16 having a convex spherical surface 18 thereon with a center of curvature substantially at the juncture of rod 16 and screw 15, the spherical surface forming one electrode of an electrical circuit to be hereinafter described. As best shown in Fig. 2, the weight is longitudinally fluted at its periphery for a purpose to be hereinafter described. The other end of tube 13 is closed by an electrical insulating wall 19 which threadedly carries an adjustable stainless steel electrode 20 having a concave spherical surface 21 thereon facing surface 18 and substantially equidistant therefrom at all points. The chamber 22 formed by tube 13 is filled with a suitable electrolyte 23, such as three parts glycerine and one part methyl alcohol.

It will be apparent that a lateral acceleration applied to device 11 will, due to the inertia of weight 17, produce relative movement between the juxtaposed surfaces 18, 21 and vary the volume of electrolyte therebetween in space 24. Wires 25, 26 are electrically connected, respectively, to electrodes 17, 20 with a potential thereacross and it will be apparent that the resistance between the electrodes will vary with variations of this volume. The flutes on weight 17, previously referred to, produce turbulence in the electrolyte upon relative swinging movement of the electrodes and thus damp relative oscillation thereof.

Referring to Fig. 6, the variable resistor device 11 is disposed in a free running multivibrator operating at approximately 8000 C. P. S., this vibrator comprising electronic tubes 30, 30a, having plates 31, 31a, respectively, filaments 32, 32a, respectively, and control grids 33, 33a, respectively, connected as shown, with suitable resistors, 34, 34a, 34b, condensers, 35, 35a, bias battery 36 and plate voltage supply B+. In the operation of the multivibrator, as controlled by variable resistor device 11, it will be assumed that tubes 30, 30a are not conducting and that a positive signal is applied to grid 33. This signal will cause electrons to flow through tube 30 and resistor 34a to the plate voltage source B+. This increased flow through resistor 34a will cause the voltage at plate 31 to become more negative, thereby placing a negative potential on grid 33a through condenser 35. This negative potential will maintain tube 30a at a cut off condition until such time as the negative voltage on condenser 35 leaks off through resistor 11. When this negative voltage has decreased sufficiently to cause grid 33a to reach a positive potential greater than the cut off potential of tube 30a, the latter will commence conducting with electrons flowing through resistor 34b to plate supply source B+. This increased flow through resistor 34b will cause a negative potential to be applied to grid 33 through condenser 35a and cut off tube 30. Tube 30 will remain cut off until the negative potential on condenser 35a has leaked off through resistor 34, and in so doing, raising the potential of grid 33 above the cut off potential of tube 30, at which time tube 30 will conduct and the cycle repeated as previously described. It will be apparent that the length of time tube 30a conducts, and therefore the frequency of the circuit, is determined by the length of time required for the negatively charged condenser 35 to leak off through resistor 11. As the resistance of variable resistor 11 increases the RC constant of resistor 11 and condenser 35 will increase thereby increasing the time required for condenser 35 to discharge, which in turn, will decrease the frequency of the multivibrator. Similarly, if the resistance of resistor 11 decreases, the frequency of the multivibrator will increase.

In operation, as missile or other body 10 yaws in its general direction of movement along axis 27 the electrodes 18, 21 will swing relatively and vary the resistance therebetween which will, in turn, vary the frequency of the multivibrator in a manner proportional to the variation in resistance as previously described. The varying signal S of the multivibrator across wires 37, 38 may be utilized in any desired manner, such as a corrective factor to be applied to the directional controls of the device.

In the construction so far described rod 16 is circular and hence the electrodes may swing relatively in any direction. In some installations it will be desirable to measure acceleration in a particular plane and for this purpose rod 16 may be constructed as a flat spring rod 16a, as shown in Fig. 5, wherein its movement is restrained to movement in plane 39.

It will be apparent that the sensitivity of the device may be varied by varying the length of rod 16 (or 16a) and/or varying the mass of electrode weight 17 and that calibration may be effected by varying the distance between the electrodes and their juxtaposed areas.

The device may be employed with a rocket, torpedo, other missile or movable body.

Obviously many modifications and variations of the present invention are possible in the light of the above teachings. It is therefore to be understood that within the scope of the appended claims the invention may be practiced otherwise than as specifically described.

What is claimed is:

1. Apparatus for measuring acceleration of a moving body in a direction transverse to its general direction of movement, comprising; an electrical resistance device carried by the body having a pair of electrodes adapted to move relatively in response to transverse acceleration of the body, said electrodes being disposed within an electrolyte, the electrical resistance between which, through the electrolyte, varies as the electrodes move relatively, and means for measuring variations in the resistance between the electrodes.

2. Apparatus in accordance with claim 1 wherein said electrodes are adapted to move relatively in all directions in a plane substantially perpendicular to the general direction of movement of the body.

3. Apparatus in accordance with claim 1 wherein said electrodes are adapted to move relatively in a single linear direction in a plane substantially perpendicular to the general direction of movement of the body.

4. Apparatus in accordance with claim 1 wherein the last named means comprises a free running multivibrator circuit adapted to change frequency in response to change in resistance between the electrodes.

5. An acceleration responsive device comprising; a closed chamber having electrolyte therein, an electrically conducting weight swingably supported in the chamber, an electrically conducting member disposed within the chamber, said weight and member having juxtaposed spaced relatively movable surfaces, the electrolyte filling the space therebetween and adapted to conduct electricity therethrough, forming a variable electrical resistance, and an electrical circuit including said resistance.

6. Acceleration responsive apparatus comprising; a closed chamber having electrolyte therein, a resilient rod within the chamber having one end fixed relative to the latter and the other end provided with an affixed weight adapted to swing about the point of affixation of the rod and chamber, an electrically conducting member carried by the chamber having a face within the chamber disposed in juxtaposed spaced relation to a face on the weight, the space between the faces within the electrolyte forming a variable electrical resistance, and an electric circuit including said resistance.

7. Apparatus in accordance with claim 6 wherein the faces on the weight and member are disposed a substantially fixed distance apart in all relative positions thereof.

8. Apparatus in accordance with claim 7 wherein one of said faces is convex and the other concave, the faces being spherical shaped and having centers of curvature substantially at the point of affixation of the rod and chamber.

FRANK J. KIRBY.
WILLIS E. VORE.

References Cited in the file of this patent
UNITED STATES PATENTS

| Number | Name | Date |
| --- | --- | --- |
| 1,936,321 | Ambronn | Nov. 21, 1936 |
| 2,338,732 | Nosker | Jan. 11, 1944 |
| 2,420,351 | Brown | May 13, 1947 |
| 2,474,610 | Wunsch | June 28, 1949 |